United States Patent Office 3,707,520
Patented Dec. 26, 1972

3,707,520
POLYMERS OF CYCLOPENTENE OBTAINED BY POLYMERIZING TO A PREDETERMINED CONVERSION AND ADDING MONO OR DIOLEFIN THERETO
Gottfried Pampus, Leverkusen, Josef Witte, Cologne, and Günter Marwede, Leverkusen, Germany, assignors to Bayer Aktiengesellschaft, Leverkusen, Germany
No Drawing. Filed Mar. 9, 1970, Ser. No. 17,926
Claims priority, application Germany, Mar. 27, 1969, P 19 15 684.4
Int. Cl. C08f 1/28, 7/02, 45/28
U.S. Cl. 260—33.6 AQ           4 Claims

ABSTRACT OF THE DISCLOSURE

Two-stage process for producing cyclopentene polymers, wherein cyclopentene is polymerised in a solvent in the presence of a metal-organic mixed catalyst to a conversion of 40 to 90% by weight, an olefin or diolefin is added and polymerisation is completed.

---

Cyclopentene can be polymerised to form linear unsaturated polymers, using catalysts composed of compounds of metals of Groups Va or VIa of the Periodic Table and organometallic compounds of metals of Groups Ia, IIa and IIIa of the Periodic Table. The double bonds in these polymers may preferentially be in cis- or trans-configuration, depending on the catalyst used. The polymers may be vulcanised in the usual manner to produce elastomers which have interesting technical properties.

The molecular weights of the polymers produced in this way can be influenced to some limited extent by varying the quantity and composition of the catalysts. When specific catalysts are selected a change in molecular weight is, however, often associated with reduced polymerisation velocity or with a change in the molecular structure, which results, for example, in reduced stereospecificity.

The molecular weight may also be altered by adding monoolefines or conjugated dienes to the cyclopentene to be polymerised. However, all the unwanted side effects described above then occur. An increase in the molecular weight can generally not be obtained by this method but usually only a reduction.

The most important qualities of a synthetic elastomer are its processing characteristics in the unvulcanised state and the physical properties of the vulcanisate. High molecular weights improve the quality of the vulcanisate but often aggravate processing. For a given microstructure, these two properties also depend on the macrostructure of the polymers, i.e., molecular weight distribution, branching and gel content (degree or cross-linking). In practice, the ease with which an elastomer can be processed can be characterised, e.g. by its viscosity number ($\eta$), its Mooney viscosity ML4'/100° C. and its Defo hardness, each elastomer having a different set of values for optimum processing.

It is the object of the invention to adjust the molecular weight, molecular weight distribution and degree of branching and hence ability of a cyclopentene polymer to be processed to the optimum values independently of the composition of the catalyst used.

The invention thus relates to cyclopentene polymerisation with ring opening using organometallic mixed catalysts of compounds of metals of Groups Va or VIa of the Periodic Table, organic aluminium compounds and, if desired, co-catalysts in inert solvents, wherein cyclopentene is polymerised alone in a first stage and the polymer solution which is obtained is reacted in a second stage with an olefine or diolefine at a temperature of about −10 to +50° C.

Examples of catalysts suitable for the process consist of:

(a) A compound of a metal of Group Va or VIa of the Periodic Table, e.g. vanadium, niobium, tantalum, chromium, molybdenum or tungsten. Halides of these metals are preferred, for example $TaCl_5$, $TaCl_4$, $TaCl_3$, $TaOCl_3$, $TaBr_5$, $WCl_6$, $WCl_5$ or $WOCl_4$;

(b) An organic aluminium compound, preferably an aluminium alkyl or aluminium alkyl halide (alkyl containing preferred 1 to 10 carbon atoms). Aluminium trialkyls containing 1 to 10 carbon atoms in the alkyl group are particularly suitable, e.g. triethyl aluminium, tributyl aluminium. Further suitable are aluminium alkyldihalides such as aluminium ethyl dichloride, aluminium dialkylhalides (alkyl also having preferably 1–10 carbon atoms, halide meaning preferably chloride, bromide and iodide) such as aluminium diethyl chloride and aluminium sesquihalide.

Co-catalysts (c) may be added but can also be omitted. Many compounds are suitable for this purpose. Thus, for example, the following may be used:

(1) Compounds having O—O or OH groups. Examples of compounds which contain oxygen-oxygen bonds are alkyl peroxides such as diethyl peroxide, diacyl peroxides, alkyl hydroperoxides, arylalkyl peroxides, peracids or esters thereof, peroxides of ketones, aldehydes or acetals. Examples of compounds which have OH groups are alcohols such as methanol or butanol, carboxylic acids such as acetic acid or benzoic acid, and phenol.

(2) Halogen compounds which show a co-catalytic action in Friedel-Crafts reactions (see, e.g., C. A. Thomas, "Anhydrous Aluminium Chloride in Organic Chemistry," New York, 1941, pages 24, 101, 121, 201, 596).

Of these compounds, the following are particularly suitable: allyl halides such as allyl chloride, 3-chlorocyclopentene, benzyl chloride; tertiary alkylhalides, such as tertiary butyl chloride, tertiary amyl chloride; $\alpha$-haloketone such as $\alpha$-chloroacetone, $\alpha$-bromoacetone; cyclic and linear $\alpha$-haloethers such as $\alpha$-chlorodiethyl ether; hydrohalic acids such as hydrogen chloride, hydrogen bromide, preferably prepared in situ from tantalum halide and water, and hydrohalic acid salts such as ferric chloride or cupric chloride.

(3) Epoxides such as ethylene oxide, propylene oxide, cyclopentene oxide, phenylglycidyl ether, epichlorohydrin and epibromohydrin.

(4) $\beta$-haloalcohols or halophenols, e.g. 2-chloroethanol-1, 2-chlorocyclohexanol, 1,3-dichloroisopropanol-2, p-chlorophenol.

The metal salts of Groups V and VI may also first be reacted alone with the co-catalyst. Such reaction products are sometimes particularly suitable for use as catalyst components.

The ratio of the two or respectively three catalyst components may vary within wide limits. Thus, the proportion by weight of metal compounds of Group Va or VIa of the Periodic Table to the aluminium compound may be 1:0.3 to 1:10. The proportion by weight of the metal compound of Group Va or VIa of the Periodic Table to the co-catalyst may be between 1:0 and 1:100 by weight.

Linear, branched or cyclic olefines or diolefines may be used in the second stage of this process and their quantities may be 0.01 to 20% by weight, preferably 0.1 to 10% by weight, based on cyclopentene. Preferred are $\alpha$-olefines having up to 5 carbon atoms, conjugated diolefines having 4–8 carbon atoms and polycyclic olefins. Mixtures can also be used. Examples of suitable olefins are: butene-1, isobutene, butadiene, isoprene, pentadiene-1,3, dicyclopentadiene, hexadiene-1,4, norbornene, norbornadiene.

The process is generally carried out as follows: cyclopentene is first added to a solution of the metal compound of Group Va or VIa of the Periodic Table in a suitable solvent, then, if desired, the co-catalyst and lastly the organic aluminium component. Polymerisation is carried out at temperatures of between −60 and +60° C., and preferably between −30 and +10° C. It may take, for approximately 0.5 molar solution of the tungsten compound. The solution was then cooled to −5° C. and diethyl aluminium chloride was added. After a polymerisation time of 4 hours at 0 to +5° C., the olefines shown in the table diluted with 5 times their quantity of toluene are introduced dropwise in the course of 5 to 10 minutes and the reaction mixture was then stirred for one hour at +10° C. The polymers were isolated by precipitation with ethanol.

TABLE 1

| Mm. of tungsten per 100 g. of cyclopentene | Molar ratio of Al-alkyl to W-salt | Amount of olefine added in percent by weight based on cyclopentene | Conversion, percent | ($\eta$) | ML-4/ 100° C. | Defo hardness at 80° C. |
|---|---|---|---|---|---|---|
| 0.5 | 2.5 | | 70 | 1.7 | 21 | 95/4 |
| 0.5 | 2.5 | 1.0 isoprene | 69 | 1.9 | 38 | 140/3 |
| 0.4 | 3.0 | | 68 | 3.2 | 137 | 900/8 |
| 0.4 | 3.0 | 1.0 hexadiene-1, 4 | 65 | 1.7 | 23 | 55/0 |
| 0.4 | 3.0 | 0.1 butene-1 | 68 | 2.6 | 71 | 325/3 |
| 0.5 | 2.0 | 0.5 dicyclopentadiene | 77 | 2.1 | 48 | 260/8 |
| 0.5 | 2.0 | 3.0 dicyclopentadiene | 77 | 2.5 | 92 | 825/27 |
| 0.5 | 2.5 | 0.5 norbornadiene | 75 | 1.9 | 36 | 240/11 |
| 0.5 | 2.5 | 1.0 norbornadiene | 72 | 1.9 | 38 | 310/15 |
| 0.5 | 2.5 | 2.0 norbornadiene | 71 | 2.0 | 48 | 550/21 |
| 0.5 | 2.0 | do | 75 | 2.6 | 91 | 1,075/23 | example, between 5 minutes and 5 hours. At the end of the first polymerisation stage, 40 to 90% by weight of the original cyclopentene feed is polymerised. Olefine and/or diolefine is then added in the quantities indicated above and the reaction is continued at −10 to +50° C. The polymer is processed in the usual manner, for example by steam distillation.

Suitable solvents for the process are aliphatic and aromatic hydrocarbons such as hexane, heptane, benzene, toluene and halogenated aliphatic or aromatic hydrocarbons such as chlorobenzene or chloroform.

The cyclopentene polymers produced by the process of the invention can very easily be processed. The viscosity of the polymer can be reduced or increased simply by changing the amount and kind of olefine or diolefine used. Products of particularly high molecular weight with excellent processing properties can be obtained in this way and especially good vulcanisates can be obtained because of the high molecular weight of the polymer.

One particular embodiment of the present process provides a technically elegant method of producing oil extended cyclopentene polymers. In this embodiment, cyclopentene is polymerised in the first stage of the process to give a product of medium molecular weight. Polymer solutions are obtained which are not too viscous and from which the heat of polymerisation can be dissipated efficiently and uniformly. The polymer is then reacted according to the second reaction stage of the process of this invention with a diolefine to produce a very high molecular weight cyclopentene-polymer, an extending oil is added in quantities of 5 to 100 parts (based on solid rubber), preferably in quantities of 20 to 70 parts during or after completion of this second reaction stage.

In this mode of operating the process oil extended rubber with especially valuable properties is obtained, e.g., with low cold flow and good processing properties in the crude state and excellent vulcanisate properties.

The extending oils used may be, for example, the usual paraffinic, naphthenic or aromatic mineral oils used in the rubber industry.

The products obtained are rubber-like polymers which may be used for the production of vulcanised rubber articles such as motor car tyres, buffers or conveyor belts.

EXAMPLE 1

1.5 litres of anhydrous toluene and 300 g. of anhydrous cyclopentene are introduced into a 3-litre vessel equipped with stirrer with exclusion of air and moisture and a solution of tungsten salt is added in the quantity indicated in Table 1. The tungsten salt solution was prepared by reacting 1 mol of $WCl_6$ with 2 mols of epichlorohydrin in toluene as solvent so that the finished solution was an

EXAMPLE 2

0.21 g. of $TaCl_5$ is dissolved at 20° C. in 120 ml. of toluene in a flask equipped with stirrer with exclusion of air and moisture. After 3 to 5 minutes, 1.2 g. of vinylidene chloride is added and then 40 ml. of cyclopentene. The reaction mixture is rapidly cooled to −20° C. and 0.5 ml. of a 50% solution of monoethyl aluminium dichloride in n-hexane is added. After a polymerisation time of 4 hours, a solution of 5 g. of tributylamine in 50 ml. of toluene is added. The polymer is then precipitated with ethanol, washed with ethanol and dried. The yield is 64%. The polymer has a viscosity ($\eta$) of 4.1 and the product is gel free.

When 2 g. of butadiene are added to this polymerisation mixture immediately (within a few seconds) after the addition of the ethyl aluminium dichloride, no sign of polymerisation is found. After the polymerisation has been stopped, no polymer can be precipitated with alcohol. By concentrating the reaction mixture by evaporation, 10 g. of oil can be isolated. This is a very low molecular weight polymer of cyclopentene having a viscosity ($\eta$) of less than 0.8. If, however, polymerisation is left to proceed to a conversion of about 30%, which happens after a polymerisation time of about 30 minutes, and 2 g. of butadiene are then added, a very large increase in viscosity is found within a few seconds. After a total polymerisation time of 4 hours, a 53% yield of a very high molecular weight polymer which contains considerable quantities of a coarse gel is obtained.

EXAMPLE 3

1.93 g. of $TaCl_5$ were dissolved in 1 litre of toluene in a vessel equipped with stirrer with exclusion of air and moisture and 15 g. of vinylidene chloride were added. 250 g. of cyclopentene containing 2000 p.p.m. of butene-1 were then added. After cooling to 0° C., 8.75 ml. of a 50% solution of ethyl aluminium dichloride in n-hexane were added. After a reaction time of 4 hours at 0° C., the product was worked up as in Example 2. 119 g. of polymer having a Mooney value of ML4′=27 and a Defo hardness of 200/5 were obtained. If a solution of 5 g. of norbornadiene in 150 ml. of toluene is added to the polymer solution after a reaction time of 4 hours, 126 g. of polymer having a Mooney value of ML4′=60 and a Defo hardness of 750/32 are obtained after working up. If 1.5 g. of isoprene are added instead of 5 g. of norbornadiene after 4 hours, 166 g. of polymer having a Mooney value of ML4′=170 and a Defo hardness of 4400/60 are obtained.

EXAMPLE 4

(1) Reaction of 2-chloroethanol with tungsten hexachloride.—9.9 g. of $WCl_6$ (25 mmol) and 100 ml. of anhydrous toluene are introduced into a flask equipped with stirrer with exclusion of oxygen and water. A mixture of 2.01 g. of chloroethanol (25 mmol) in 22 ml. of toluene is added dropwise with stirring in the course of 20 minutes. Hydrogen chloride liberated is displaced by nitrogen. Stirring is then continued for 3 hours while a slow stream of nitrogen is passed over. The solution prepared in this way is 0.2 molar with respect to the tungsten.

(2) Polymerisation.—800 g. of toluene and 200 g. of cyclopentene are introduced into a vessel equipped with stirrer with the exclusion of water and oxygen. 1.25 g. of a 1% solution of butene-1 in toluene are added at room temperature followed by 4 ml. of the tungsten solution prepared under (1) (=0.4 mmol of tungsten per 100 g. of cyclopentene). The reaction mixture is cooled to $-5°$ C. and 2.2 ml. of a 1.0 molar solution of $Al(C_2H_5)_2Cl$ in toluene are added. Polymerisation starts at once, as can be seen from a marked increase in the viscosity of the solution. The polymerisation temperature is maintained at 10° C. by cooling. A solution of 1.5 g. of isoprene in 10 ml. of anhydrous toluene is added after 4 hours and the reaction mixture is then stirred for 30 minutes at 10° C. The reaction is terminated by the addition of a solution of 1 g. of 2,2'-dihydroxy-3,3'-ditertiary-butyl-5,5'-dimethyl-diphenylmethane, 0.5 g. of ethanolamine and 2.0 g. of ethanol in 50 ml. of toluene. The polymer is isolated by precipitation with ethanol and dried under vacuum at 50° C.

Conversion is 78%. The viscosity number $(\eta)_{tol.,25°}$=2.49, ML-4'/100° C.=88, Defo hardness/E at 80° C.=1275/32.

The comparison sample, prepared by the same method *without the addition* of 1.5 g. of isoprene yields a polymer with the following viscosity properties:

$(\eta)_{tol.,25°\ C.}$=2.27
ML-4'/100° C.=60
Defo H/E, 80° C.=600/20

EXAMPLE 5

Three polymers were prepared by the method described in Example 4 (1). In one of these samples, no isoprene was used (Sample 1) and in another (Sample 2) isoprene was added before polymerisation was begun. The results of the experiments are summarised in the following table.

| Isoprene, g. | Addition | Conversion | $(\eta)$ toluene, 25° C. | ML-4'/ 100° C. | Defo H/E, 80° C. |
|---|---|---|---|---|---|
| | | 76 | 2.30 | 66 | 500/13 |
| 1.5 | Before starting | 70 | 2.33 | 63 | 290/3 |
| 1.5 | After 4 hours | 75 | 2.81 | 118 | 875/16 |

We claim:
1. Process for producing cyclopentene polymers which comprises polymerizing in an inert organic solvent medium a monomer consisting of cyclopentene at a temperature of from $-60$ to 60° C. in the presence of an organo-metallic mixed catalyst of (1) a compound of a metal of Groups V$a$ or VI$a$ of the Periodic System and (2) an organic aluminum compound to a conversion of 40 to 90% by weight, then adding 0.01 to 20% by weight, based on cyclopentene, of a monoolefin or diolefin, completing polymerization at a temperature of from $-10$ to 50° C. and recovering the cyclopentene polymer formed.

2. Process according to claim 1 wherein a rubber extending oil is added during or after the second stage of polymerisation.

3. Process according to claim 1 wherein the monoolefin or diolefin is butadiene, isoprene or norbornadiene.

4. Process according to claim 1 wherein said catalyst contains, as a third constituent, a compound containing an O—O or OH group, an epoxide or a halogen compound.

References Cited
UNITED STATES PATENTS

| 3,520,856 | 7/1970 | Dall'Asta | 260—79.5 |
| 3,029,231 | 4/1962 | Amerongen | 260—87.5 |
| 3,220,999 | 11/1965 | Duck et al. | 260—94.3 |
| 3,392,213 | 7/1968 | Berger | 260—878 |
| 3,449,310 | 6/1969 | Dall'Asta et al. | 260—93.1 |
| 3,476,728 | 11/1969 | Natta et al. | 260—93.1 |
| 3,523,145 | 4/1970 | Manaresi et al. | 260—886 |

JAMES A. SEIDLECK, Primary Examiner
R. A. GAITHER, Assistant Examiner

U.S. Cl. X.R.

260—33.6 AQ, 88.2 E, 878 R, 879, 82.1, 93.1